United States Patent [19]

Weiss

[11] 3,871,228
[45] Mar. 18, 1975

[54] PERMEABLE MEMBRANE GAS SATUROMETER

[75] Inventor: Ray Franklin Weiss, La Jolla, Calif.

[73] Assignee: The United States of America as represented by the Secretary of the Navy, Washington, D.C.

[22] Filed: May 14, 1973

[21] Appl. No.: 360,249

[52] U.S. Cl. .................................. 73/19, 55/158
[51] Int. Cl. ........................................... G01n 7/10
[58] Field of Search ............... 73/19, 23, 23.1, 431; 55/158, 270

[56] References Cited
UNITED STATES PATENTS

| | | | |
|---|---|---|---|
| 3,060,726 | 10/1962 | Weber | 73/19 |
| 3,397,790 | 8/1968 | Newby et al. | 55/158 X |
| 3,605,484 | 9/1971 | Wunning | 73/23 |
| 3,668,837 | 2/1970 | Gross | 55/158 |
| 3,673,864 | 7/1972 | Cubberly | 73/19 X |
| 3,681,026 | 8/1972 | Holden | 73/23 X |
| 3,751,879 | 8/1973 | Allington | 55/158 |

Primary Examiner—Richard C. Queisser
Assistant Examiner—Stephen A. Kreitman
Attorney, Agent, or Firm—Richard S. Sciascia; Paul N. Critchlow

[57] ABSTRACT

The saturometer measures the total dissolved gas pressure present in solutions such as in rivers, lakes, and other water bodies. A di-methyl silicone rubber tubing, permeable to gases and water vapor, is immersed in the water and a precision pressure gauge coupled to the tubing measures the internal pressures produced by gas components diffusing into the bore through the membrane wall.

6 Claims, 3 Drawing Figures

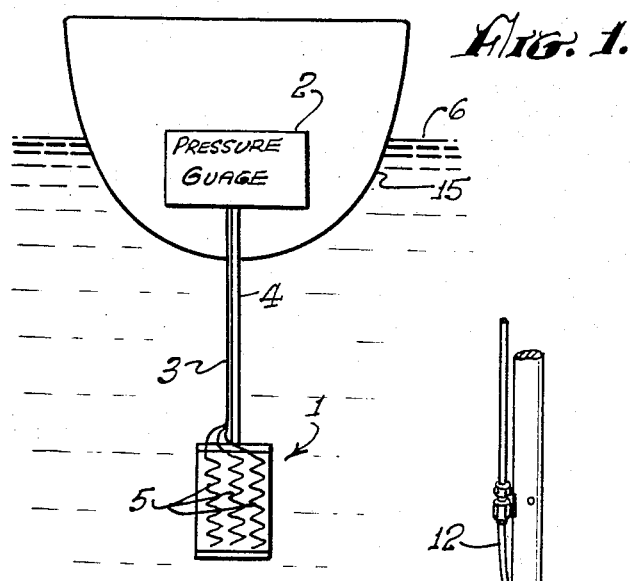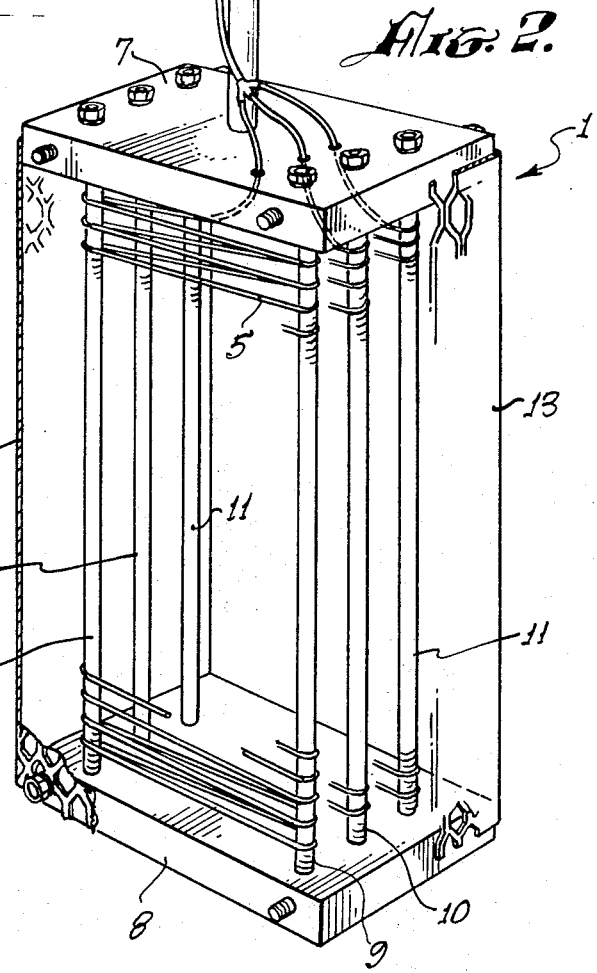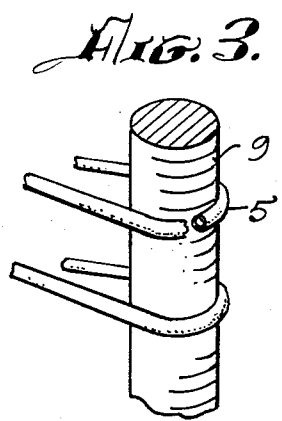

PERMEABLE MEMBRANE GAS SATUROMETER

BACKGROUND OF THE INVENTION

The present invention relates to instruments and techniques for determining the pressure of gases dissolved in a solution.

Instruments and techniques for determining the pressures and amounts of gas in solutions for the most part have been concerned with particular gas components as contrasted with the measurement of the total pressure of all gases dissolved in the solution. For example, there are a variety of instruments for determining the amount of oxygen dissolved in waters or for measuring concentrations of certain pollutants which must be treated or removed.

The measurement of total, as opposed to individual, gas pressure provides valuable data especially in situations where the data is indicative of undesirable environmental conditions or in studies to determine relationships between, for example, excess pressures and biological phenomena that have created problems. In particular, fish life in rivers, lakes and hatcheries has been threatened by what is known as "gas-bubble disease" and there is strong evidence that this disease is due to the pressure of dissolved gases in these bodies of water. Consequently, instruments capable of quickly and easily providing the pressure information are needed both to study the disease and to continuously monitor waters where adverse conditions are suspected.

Prior instruments which can be referred to as saturometers involve rather tedious and lengthy procedures which obviously present serious disadvantages when a large number of measurements must be taken to cover a relatively large body of water or the streams and tributaries flowing into the body. Also, these saturometers appear to involve rather expensive equipment and proper operation requires at least some degree of skill and training. A further difficulty is that some of these instruments require pretreatment of the solution to be tested and this treatment must be conducted in a laboratory or other location as opposed to permitting a quick and readily available determination in situ.

It is therefore an object of the present invention to provide a gas saturometer which is small, portable, relatively inexpensive and capable of being used directly in the solution to be tested.

Another object is to provide such a saturometer capable of being used on lakes, rivers or oceans to provide reliable solution pressure data relative to a large area in a minimum of time.

A further object is to provide a saturometer in accordance with the foregoing objects, the saturometer being of such a nature that its output data readily can be applied to a readout device, such as a computer.

In accordance with the invention, the present saturometer generally includes as its active element a membrane-type sensor, preferably constructed of di-methyl silicone rubber tubing diffusively permeable to gases and water vapor. The pressure readout is communicated with the interior bore of the tubing and the readout, most suitably, is a manometer or a precision pressure gauge. Partial pressures of each component gas in the solution diffuse through the thin-wall membrane and their total pressure is applied to the pressure gauge to provide the desired data.

BRIEF DESCRIPTION OF THE DRAWINGS

A preferred embodiment of the present invention is illustrated in the accompanying drawings of which:

FIG. 1 is a schematic illustration showing the manner in which the present saturometer is used in a large body of water, such as a river, lake or ocean, FIG. 2 is a perspective showing a particular sensor arrangement, and FIG. 3 is an enlarged view of a section of the sensors.

DETAILED DESCRIPTION OF THE INVENTION

The saturometer illustrated in FIG. 1 generally is formed of three principle components, these being an active element or sensor 1, a pressure gauge 2 and a conduit 3 communicating the sensor with the gauge. A rod 4 may be used to support the sensor while the tests are being run. The instrumentation may be used in a variety of manners such, for example, as mounting it on a boat 15 which carries it to a particular location on a body of water, such as lake 6, where sensor 1 is immersed for test purposes.

The saturometer itself is quite simple both in structure and operation although the results that have been obtained and the rapid manner in which they can be obtained make it an extremely attractive instrument for field work. A significant feature of the present invention is its use of a thin-walled, gas-permeable membrane as its active element or sensor 1. Preferably a di-methyl silicon tubing 5 is used in the sensor, this tubing being of a Silastic brand, medical-grade, manufactured by Dow Corning Corporation, Medical Products Division. Other permeable membranes may be substituted as long as the membranes are permeable to gases and water vapor or, in other words, permit the diffusion of these gases through their walls. Such permeable membranes are rather well known at the present time and their diffusion characteristics are available in the literature. For present purposes, it is desired that the diffusion occur in a relatively rapid manner and that the tubing itself be compatible with the environmental conditions in which it will be used.

FIG. 2 illustrates a particularly advantageous sensor arrangement. As shown, the sensor includes a frame member formed of upper and lower plates 7 and 8 which mount three pairs of spaced, elongate rods or legs 9, 10 and 11 on which permeable membrane tubing 5 is wound. The tubing itself is provided in three fifty foot lengths, each of these lengths being wound on a separate pair of the legs and, most suitably, a sealant of silicon rubber or the like is used to seal the free end of each length of the tubing. The other ends of each of the lengths are, as shown, joined in parallel to an impermeable conduit 12 to couple the entire volumetric area of the bore of the tube lengths to pressure gauge 2 (FIG. 1). In practice, the di-methyl silicone tubing used in the sensor is 0.025 inch outer diameter by 0.012 inch inner diameter and the three lengths of this tubing are joined to an 0.034 inch inner diameter nylon tubing, the outer diameter of which is 0.064 inch. Preferably, legs 9, 10 and 11 are formed of thread stock rods each of the legs being 12 inches long and the spacing between each pair of legs being about 4.5 inches. A silicone sealant is used to hold the tubing in the grooves of the thread stock. The arrangement thus contemplates the formation of three "paddles" which, in turn, are sandwiched together and, preferably, are covered by a protective screen 13 bolted to plates 7 and 8. As has been noted, a rod 4 is employed to support the sensor when in use. This rod obviously can be carried in any desired manner on the boat or other conveyance used to transport the saturometer to the test location.

Pressure gauge 2 may vary according to the intended use, although, for use in the lakes or rivers to monitor total dissolved gas pressures in these waters, it is desired to measure "excess gas pressure" which simply is the sum of the partial pressures minus the barometric pressure. For this purpose, a 2 mm internal diameter mercury manometer is employed, the manometer having one leg exposed to the atmosphere. A more portable but less accurate substitute for the manometer is a low internal volume pressure gauge.

In operation, the sensor is immersed in water and the partial pressure of each component gas dissolved in the water diffuses through the membrane wall into its interior bore, each component following a logarithmic approach to its equilibrium value with a characteristic time that is proportional to its diffusivity in the di-methyl silicon rubber. Preferably, in a highly supersaturated solution, a certain amount of agitation of the sensor is used to dislodge bubbles that otherwise might interfere with the accuracy of the measurement. The pressure developed within the bore of the permeable tubing manifestly is applied to the pressure gauge or manometer and, assuming the use of a manometer the readout is in terms of the so-called "excess gas pressure." Since the accuracy of the readout depends upon the application of the full amount of the total dissolved gas pressure to the pressure gauge, it is desirable to assure against leakage by employing sealants for all of the couplings and also by providing couplings that are reliable and leak-proof. For example, the connection of the manometer can be made using a standard one-sixteenth inch Swagelok (Crawford Fitting Co.) tube fitting.

An instrument formed in the previously described manner and conforming essentially with that illustrated in FIG. 2 has been used with excellent results to monitor gas pressures in water such as the waters in the Columbia River where gas bubble disease possibly resulting from dissolved gas pressures has become a series environmental problem. Actual field measurements on the Columbia River show excellent agreement with results calculated from the Winkler oxygen and Van Slyke manometric measurements using published solubility data.

The response time of the instrument is proportional to the following ratio:

$$\frac{\text{internal volume of the system} \times \text{membrane thickness}}{\text{membrane area}}.$$

To obtain a rapid response small internal volumes are most desirable and, of course, the membrane thickness must be a minimum. Further, as is apparent, reduction in the response time is proportional to the membrane area which, in the illustrated instrument is maximized to three 50 foot tubing lengths. In particular, the present instrument has been found extremely attractive for field work since the tests are in situ and the samples to be tested need not be stored or transported to a laboratory. Also, the operator needs only moderate training and skill and the instrument is inexpensive, easily constructed and capable of providing accurate data in a remarkably short period of time. It is contemplated that the output data will be fed into a computer which, if used, can provide corrections for altitude etc. Although the primary purpose of the present saturometer is one of monitoring total dissolved gas pressure in solution, it can be used for other purposes. Thus assuming some selectivity in the diffusion rate of individual gas components, it conceiveably could be employed to obtain data on particular components.

Obviously many modifications and variations of the present invention are possibly in the light of the above teachings. It is therefore to be understood that within the scope of the appended claims the invention may be practiced otherwise than as specifically described.

I claim:

1. Apparatus for measuring in situ the total pressure of gas components present in a large body of water comprising:
   a thin-walled gas-permeable membrane sensor formed as an elongate flexible tube having a relatively small internal volumetric area and a relatively large external surface area,
   a pressure gauge,
   conduit means coupling said internal area to said gauge for conducting internal area gas pressures to the gauge, 2. The apparatus of claim 1 wherein said sensor is formed of a di-methyl silicone tubing.

3. The apparatus of claim 1 wherein said pressure gauge is a manometer in which said internal pressures act against barometric pressures.

4. The apparatus of claim 1 wherein the characteristics response time required for said internal pressure to reach equilibrium is proportional to the following ratio:

$$\frac{\text{internal volume of membrane} \times \text{membrane thickness}}{\text{membrane area}}$$

5. The apparatus of claim 1 wherein said frame includes plural pairs of said spaced legs and said sensor is in the form of a separate elongate tube wound on each pair of the legs.

6. The apparatus of claim 5 wherein said elongate tubes each are not appreciably less than fifty foot in length and each has an outer diameter of about 0.025 inches and an inner diameter of about 0.012 inches.

* * * * *